US008440262B2

(12) United States Patent
Dandenault et al.

(10) Patent No.: US 8,440,262 B2
(45) Date of Patent: May 14, 2013

(54) FAST FILM FORMATION WATER BASED BARRIER COATING

(75) Inventors: Francois Dandenault, Bromont (CA); Djamel Baghdad Daidj, Granby (CA); Serge Berube, L'Assomption (CA)

(73) Assignee: Retec F3 Technologies, Sec., Granby, QC (CA)

( * ) Notice: Subject to any disclaimer, the term of this patent is extended or adjusted under 35 U.S.C. 154(b) by 239 days.

(21) Appl. No.: 12/734,931

(22) PCT Filed: Dec. 4, 2008

(86) PCT No.: PCT/CA2008/002139
§ 371 (c)(1),
(2), (4) Date: Aug. 26, 2010

(87) PCT Pub. No.: WO2009/070895
PCT Pub. Date: Jun. 11, 2009

(65) Prior Publication Data
US 2011/0275261 A1    Nov. 10, 2011

Related U.S. Application Data

(60) Provisional application No. 60/996,814, filed on Dec. 6, 2007.

(51) Int. Cl.
*B05D 5/00* (2006.01)
(52) U.S. Cl.
USPC ............ 427/288; 427/335; 524/394; 524/400
(58) Field of Classification Search .................. 524/394, 524/400; 427/288, 335
See application file for complete search history.

(56) References Cited

U.S. PATENT DOCUMENTS

| 2,914,412 | A | | 11/1959 | Stephan | |
|---|---|---|---|---|---|
| 3,397,162 | A | | 8/1968 | Takigawa et al. | |
| 3,480,466 | A | | 11/1969 | Benson et al. | |
| 3,864,151 | A | * | 2/1975 | Shonebarger et al. | 427/393.5 |
| 3,946,135 | A | | 3/1976 | Peterson | |
| 4,141,868 | A | * | 2/1979 | Emmons et al. | 524/237 |
| 4,367,276 | A | | 1/1983 | Cooper et al. | |
| 5,330,564 | A | * | 7/1994 | Geke et al. | 106/2 |
| 6,103,802 | A | | 8/2000 | Zhang et al. | |
| 6,187,389 | B1 | * | 2/2001 | Overcash et al. | 427/488 |
| 2001/0005549 | A1 | * | 6/2001 | Kawanishi et al. | 428/341 |
| 2003/0149151 | A1 | * | 8/2003 | Berube | 524/398 |
| 2005/0112387 | A1 | * | 5/2005 | Druckrey et al. | 428/452 |
| 2006/0062850 | A1 | * | 3/2006 | Chen et al. | 424/468 |

FOREIGN PATENT DOCUMENTS

| CA | 1098242 | 3/1981 |
|---|---|---|
| CA | 2707865 | 6/2009 |
| JP | 05-016550 | 1/1993 |
| SU | 1650665 | 5/1991 |
| WO | 2005044469 | 5/2005 |

OTHER PUBLICATIONS

Zaclon (Quilon Products).*
Supplementary European Search Report, EP 08 85 8258, May 25, 2011.
English language translation of SU 1650665.

* cited by examiner

*Primary Examiner* — Ling Choi
*Assistant Examiner* — Wenwen Cai
(74) *Attorney, Agent, or Firm* — Norton Rose Canada LLP

(57) ABSTRACT

The invention relates to a composition which, when mixed with a polymer composition, allows for the formation of a continuous and cohesive film. The film is characterized in that it provides water, grease and oil resistance, provides a water vapor barrier and can be used as wax replacement treatment and a top coat for flexible packaging, but also on other substrates. This film is formed at a very fast set speed without the need of thermal energy. The composition contains i) a salt of one or more of myristic, palmitic and stearic acid; and preferably also ii) a $C_9$-$C_{18}$ fatty acid complex of a metal ion, said metal ion having an oxidation state of at least 3. The invention also provides processes and coated substrates.

17 Claims, No Drawings

FAST FILM FORMATION WATER BASED BARRIER COATING

CROSS-REFERENCE TO RELATED APPLICATIONS

This application is a National entry of PCT/CA/2008/002139 filed Dec. 4,2008, in which the United States of America was designated and elected, and which remains pending in the International phase until Jun. 19,2010, which application in turn claims priority under 35 USC 119 (e) from U.S. Provisional application Ser. No. 60/996,814 filed Dec.6, 2007.

TECHNICAL FIELD

The present invention relates to a novel composition that allows for the formation of a continuous and cohesive film which provides water resistance, grease and oil resistance release, water repellency, water vapour resistance at a very fast set speed without the need of a thermal energy, to be used as wax replacement treatment and a top coat for flexible packaging. The invention also relates to packaging, containers, food wrappers, receptacles and the like formed from such coated materials. The invention also relates to methods for making same. The invention also relates to surface treatments in which the surface is for example metal, textile, wood, concrete and related building products.

BACKGROUND ART

Water based barrier coatings when applied to paper and paperboard contain water that has to be removed to form a continuous film. The quality of the continuous film, free of defects, is very important to achieve the optimal barrier properties.

A drying process normally removes water. The drying process is usually a thermal one (conduction, convection, radiation) in which heat is provided to the liquid to vaporize the water.

The drying condition is one of the most important factors that affect the coating performance. Quality problems such as bubbles, blisters, pinholes or cracks can occur with improper drying conditions. The production conditions must be adapted to the type of machine, coating used and the coat weight.

The cost of the drying represents a major part of the process cost, and as energy costs rise, drying efficiency becomes increasingly important.

Thus, in a time of concern over energy environment and petroleum resources, it would be beneficial to be able to coat paper using water based barrier coating without the need of heat or dryer while still having a high rate of speed of coating.

DISCLOSURE OF THE INVENTION

The invention seeks to provide a composition which with a polymer composition allows rapid formation of a dry film.

The invention also seeks to provide a process for providing water vapour, oil and grease resistance to a material.

The invention further seeks to provide the use of a composition for formation of a coating or film.

The invention still further seeks to provide a substrate material having a film coating.

In one aspect the invention relates to a composition which, when mixed with a polymer composition, allows for the formation of a continuous and cohesive film. The film is characterized in that it provides water, grease and oil resistance, provides a water vapour barrier and can used as wax replacement treatment and a top coat for flexible packaging, but also on other substrates. This film is formed at a very fast set speed without the need of thermal energy.

In another aspect the invention relates to the use of i) a salt of one or more of myristic, palmitic and stearic acid; and ii) a $C_9$-$C_{18}$ fatty acid complex of a metal ion, said metal ion having an oxidation state of at least 3.

The salt and the fatty acid complex can be added individually or as part of a dispersion to the aforementioned polymer composition.

Accordingly, in another aspect the invention relates to a catalytic composition comprising i) a metal salt of one or more of myristic, palmitic and stearic acid; and ii) a $C_9$-$C_{18}$ fatty acid complex of a metal ion, said metal ion having an oxidation state of at least 3.

A further aspect of the invention relates to water-based polymeric composition for film forming comprising i) a dibasic salt of one or more of myristic, palmitic and stearic acid; ii) a $C_9$-$C_{18}$ fatty acid complex of a metal ion, said metal ion having an oxidation state of at least 3; and iii) a polymeric composition comprising a polymer, copolymer, or a mixture of polymers or copolymers.

Another aspect of the invention relates to a premixture composition comprising any two of i) a dibasic salt of one or more of myristic, palmitic and stearic acid; ii) a $C_9$-$C_{18}$ fatty acid complex of a metal ion, said metal ion having an oxidation state of at least 3; and iii) a polymeric composition comprising a polymer, copolymer, or a mixture of polymers or copolymers.

In yet another aspect the invention relates to a substrate having a surface coated with a film formed from the polymeric composition of the invention.

The invention further relates to a cellulose-based surface comprising a film formed from the polymeric film-forming composition of the invention. The invention further relates to a metallic surface comprising a film formed from the polymeric film-forming composition of the invention. The invention further relates to a textile comprising a film formed from the polymeric film-forming composition of the invention. The invention further relates to glass comprising a film formed from the polymeric film-forming composition of the invention.

The invention further relates to a process for coating a surface comprising the use of a water-based polymeric composition without the use of thermal energy or microwave energy.

The invention provides, in one embodiment, a coated sheet material that is readily biodegradable, as well as recyclable and repulpable because of the classes of ingredient employed. The present invention provides coated sheet material, such as cellulose-based materials including kraft paper, that is resistant to penetration by grease and oil, and that is also resistant to penetration by water moisture. Accordingly, embodiments of the present invention relate to containers and packaging for foodstuff, for frozen foods, as ovenable containers, as food wrappers, as receptacles, and as storage containers.

In still another aspect of the invention there is provided a composition i) and iii) above for forming a film coating in accordance with the invention.

DESCRIPTION OF PREFERRED EMBODIMENTS

The present invention relates to a water based wax-free coating which forms a film at a very fast rate without the need for added heat. It provides excellent water resistance (tack free), grease and oil resistance and good water vapour barrier properties.

The success of functional coatings generally depends on having a uniform coating. A continuous film, free of defect, is particularly important for barrier properties. Film formation in coating involves the change from liquid to solid state. This is done by the evaporation of the water and coalescence of the particles of the dispersion. The polymer is initially present as discrete spheres separated by a continuous water phase. The water is removed by evaporation and by penetration into the porous substrate. As the concentration increase, the polymer particles move closer together. In this particular case, water is absorbed so fast by the substrate, that the spheres or particles are forced into ever-closer contact.

Eventually, the spheres become crowded so tightly, that the space between them creates capillary forces. As close packing occurs, the capillary force of the water draws the spheres or particles together to form a continuous and cohesive film.

The ease of film formation depends on the glass transition temperature, commonly known as Tg, of the polymer, the particle size, the formulation ingredients and the temperature reached during the drying process.

The present invention relates to an entirely different process wherein a salt such as calcium stearate influences the rate of film formation. Salts such as calcium stearate acts as a coalescent agent by reducing the minimum film forming temperature. Also, the salt, such as calcium stearate acts as an emulsifier and reduces the surface tension of the mixture; this allows the coating to wet the surface thoroughly and the water present in the coating is rapidly removed by penetration into the porous paper substrate.

The presence of the fatty acid complex of a metal ion, such as chromium, enhances the rate of the film formation at the same time helping to get a better film property including release, water repellency, water, water vapour, grease and oil resistance.

Therefore the water based barrier coating of the present invention rapidly forms a continuous and cohesive film free of defects, without the need for heat. The fast set drying film formation concept of this novel water based barrier coating composition allows barrier coating technology to extend the application to the non conventional equipment such as size press coaters, spray coaters, curtain coaters and flexo where the thermal source are deficient or absent.

The term catalytic composition herein is intended to mean a pre-mixture of i) a salt of one or more of myristic, palmitic and stearic acid; ii) a $C_9$-$C_{18}$ fatty acid complex of a metal ion, said metal ion having an oxidation state of at least 3.

The term polymeric film-forming composition herein is intended to mean a composition comprising i) a salt of one or more of myristic, palmitic and stearic acid; ii) a $C_9$-$C_{18}$ fatty acid complex of a metal ion, said metal ion having an oxidation state of at least 3; and iii) a polymeric composition comprising a polymer, copolymer, or a mixture of polymers or copolymers.

It has been found that air exposure to the polymeric film-forming composition of the invention leads to film formation from the composition, such as a film forming on its surface. Accordingly, one aspect of the invention relates to a pre-mixture comprising of no more than two of i) a salt of one or more of myristic, palmitic and stearic acid; ii) a $C_9$-$C_{18}$ fatty acid complex of a metal ion, said metal ion having an oxidation state of at least 3; and iii) a polymeric composition comprising a polymer, copolymer, or a mixture of polymers or copolymers.

The salt of one or more of myristic, palmitic and stearic acid is a typically a dibasic metal salt of these acids, and may be selected from, for instance, sodium stearate, potassium stearate, calcium stearate, zinc stearate; sodium myristate, potassium myristate, calcium myristate, or zinc myristate; sodium palmitate, potassium palmitate, calcium palmitate, and zinc palmitate. The salts may be in the form of an emulsion, dispersion, or in a solvent-free state.

In a suitable embodiment, the salt of one or more of myristic, palmitic and stearic acid is a metal salt of stearic acid, namely a metal stearate. More typically, the metal stearate is a dibasic metal salt of stearic acid, such as sodium stearate, calcium stearate, lithium stearate, or zinc stearate.

Dispersions of calcium or zinc stearate are sold commercially under the trade marks Devflo 50LPH, Devflo 50C and Devflo 40 RZ1. Commercial stearate dispersions or emulsions, such as those from BASF or Rohm & Haas, are also highly suitable.

The $C_9$-$C_{18}$ fatty acid complex of a metal ion, said metal ion having an oxidation state of at least 3, is a preferred component of the catalyst composition and of the polymeric film-forming composition. Quilon™ metal complexes of fatty acids have been found to be particularly suitable. Other suitable release coating materials include, for example, iron (+3)-fatty acid complexes and titanium(+4)-fatty acid complexes. Good results have been achieved with trivalent metal complexes of fatty acids, such as those mentioned above. Accordingly, the $C_9$-$C_{18}$ fatty acid complex of a metal ion, said metal ion having an oxidation state of at least 3, may be selected from a Werner complex, a trivalent metal complex of a $C_9$-$C_{18}$ fatty acid, a tetravalent metal complex of a $C_9$-$C_{18}$ fatty acid, such as chrome-$C_9$-$C_{18}$-fatty acid complexes, iron (+3)-$C_9$-$C_{18}$ fatty acid complexes, or titanium(+4)-$C_9$-$C_{18}$-fatty acid complexes.

Without being bound by a particular theory, the $C_9$-$C_{18}$ fatty acid complex of a metal ion, said metal ion having an oxidation state of at least +3, may, in certain embodiments have the following structure:

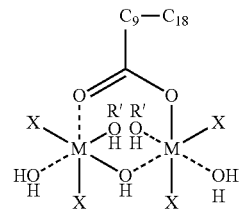

wherein M is the metal of the metal ion, R' is the solvent within which the metal complex is dispersed or emulsified, and X is a halogen, such as chlorine.

The metal ion is suitably chromium, such as in chromimium pentahydroxy(tetradecanoato) di-, tetradecanoato chromic chloride hydroxide, and octadecanoato chromic acid hydroxide. These are conventionally known as Quilon™ C or C-9, Quilon™ M, and Quilon™ S. Also suitable as the $C_9$-$C_{18}$ fatty acid complex of a metal ion are Quilon™ L, Quilon™ L-11 and Quilon™ H, including mixtures of any of the foregoing.

Thus, the Quilon complex may be Quilon C, Quilon L, Quilon M, Quilon H or Quilon S to provide specific properties. Quilon™ metal complexes of fatty acids are Werner chrome complexes of a fatty acid. A suitable embodiment of the invention comprises, as a $C_9$-$C_{18}$ fatty acid complex of a metal ion, said metal ion having an oxidation state of at least 3, a Werner complex, such as a Werner chrome complex.

$C_{11}$-$C_{18}$ fatty acid complexes of a metal ion having an oxidation stable of at least 3, such as chromium, have been found expressly suitable.

The $C_9$-$C_{18}$ fatty acid complex of a metal ion, said metal ion having an oxidation state of at least 3 may be in the form of a dispersion, suspension, emulsion, or solution in a suitable solvent. The solvent may be water, an alcohol, water-miscible organic solvents, alcohol-miscible organic solvents, and combinations thereof. Suitable alcohols include methanol, ethanol, proponol, isopropanol, butanol, pentanol, hexanol, heptanol, and cyclohexanol. Suitable water- or alcohol-miscible organic solvents include acetonitrile, ethyl acetate, pentane, hexane, heptane and petroleum ether.

An important aspect of the invention relates to the use of a salt of one or more of myristic, palmitic and stearic acid; and a $C_9$-$C_{18}$ fatty acid complex of a metal ion, said metal ion having an oxidation state of at least 3 for the preparation of a film on a surface. These components can be added individually or as a mixture, such as in the form of a dispersion, suspension, emulsion, or solution.

An important aspect of the invention relates to a water-based mixture of a salt of one or more of myristic, palmitic and stearic acid; and a $C_9$-$C_{18}$ fatty acid complex of a metal ion, said metal ion having an oxidation state of at least 3. The catalytic composition of the invention may be in the form of a dispersion, suspension, emulsion, or solution. An advantage of the present invention is that the catalytic composition of the invention may be water-based and still provide the fast-film formation on the surface. The term water-based mixture is intended to mean a dispersion, suspension, emulsion, or solution wherein at least 30% (v/v) of the solvent is water, such as at least 40%, more typically at least 50%.

In a highly suitable embodiment of the water-based mixture of a salt of one or more of myristic, palmitic and stearic acid; and a $C_9$-$C_{18}$ fatty acid complex of a metal ion, said metal ion having an oxidation state of at least 3, the salt of one or more of myristic, palmitic and stearic acid is selected from the group consisting of calcium stearate and zinc stearate.

In a further highly suitable embodiment of the water-based mixture of a salt of one or more of myristic, palmitic and stearic acid; and a $C_9$-$C_{18}$ fatty acid complex of a metal ion, said metal ion having an oxidation state of at least 3, the $C_9$-$C_{18}$ fatty acid complex of a metal ion is a chrome-$C_9$-$C_{18}$ fatty acid complex, such as one having the chemical composition of Quilon™ C. In a highly suitable embodiment, the catalytic composition of the invention comprises calcium stearate and Quilon™ C.

The ratio of i) a salt of one or more of myristic, palmitic and stearic acid to ii) a $C_9$-$C_{18}$ fatty acid complex of a metal ion in the water-based catalytic composition of the invention will vary depending on the nature of the polymer composition with which the catalytic composition will eventually be mixed, and with the nature of the surface to be covered. Typically, the ratio of i) a salt of one or more of myristic, palmitic and stearic acid to ii) a $C_9$-$C_{18}$ fatty acid complex of a metal ion in the water-based catalytic composition, is in the range of about 5:1 to 20:1, such as from about 7:1 to 20:1, such as from about 5:1 to 15:1, more typically of about 7:1 to 15:1.

In a highly suitable embodiment of the invention, the catalytic composition of the invention comprises calcium stearate and Quilon™ C in a weight ratio of 5:1 to 15:1, such as about 7:1 to 15:1. In one embodiment calcium stearate and Quilon™ C were combined in a ratio of 17 to 1.5

The catalytic composition of the invention may comprise a solvent-free combination of i) the salt of one or more of myristic, palmitic and stearic acid and ii) a $C_9$-$C_{18}$ fatty acid complex of a metal ion. Alternatively, the catalytic composition of the invention may comprise a combination of i) the salt of one or more of myristic, palmitic and stearic acid and ii) a $C_9$-$C_{18}$ fatty acid complex of a metal ion dispersed, dissolved or suspended in the solvent within which the $C_9$-$C_{18}$ fatty acid complex of a metal ion was dispersed or suspended. In a further alternative, the catalytic composition of the invention may comprise a combination of i) the salt of one or more of myristic, palmitic and stearic acid and ii) a $C_9$-$C_{18}$ fatty acid complex of a metal ion may be dispersed, dissolved or suspended in water or an aqueous mixture, such aqueous mixture typically comprising water and the solvent or solvents within which each of i) the salt of one or more of myristic, palmitic and stearic acid and ii) the $C_9$-$C_{18}$ fatty acid complex of a metal ion were dispersed, dissolved or suspended.

In an embodiment of the invention comprising i) calcium or zinc stearate and ii) a chrome-$C_9$-$C_{18}$-fatty acid complex such as Quilon™ C, and water, the components are present in a ratio of 15-20 to 1-2 to 1-2, such as 17 to 1.5 to 1.5.

The catalytic composition of the invention is combined with iii) a polymeric composition comprising a polymer, copolymer, or a mixture of polymers or copolymers to form a polymeric film-forming composition. Accordingly, a further aspect of the invention relates to a polymeric film-forming composition comprising i) a salt of one or more of myristic, palmitic and stearic acid; ii) a $C_9$-$C_{18}$ fatty acid complex of a metal ion, said metal ion having an oxidation state of at least 3; and iii) a polymeric composition comprising a polymer, copolymer, mixtures of polymers or copolymers. In a typical embodiment, the polymeric film-forming composition is a water-based polymeric film-forming composition. In a highly typical embodiment, the water-based polymeric film-forming composition comprises calcium or zinc stearate, a chrome-$C_9$-$C_{18}$-fatty acid complex such as Quilon™ C, water, and a polymeric composition comprising a polymer, copolymer, or a mixture of polymers or copolymers.

The polymer, copolymer, or mixtures of polymers or copolymers, are typically water dispersible polymers, or copolymer and are film-forming polymers or copolymers. In the preferred embodiment, the water dispersible film forming polymers or copolymers have a Glass Transition Temperature of from about −60 to 105° C., and are suitably selected to form a non-blocking film.

Polymers that may be used as cross-linkable polymers resistant to water moisture in the barrier coating composition include but are not limited to: polymers and copolymers of poly(dienes) such as poly(butadiene), poly(isoprene), and poly(1-penetenylene);

poly(acrylics) such as poly(benzyl acrylate), poly(butyl acrylate) (s), poly(2-cyanobutyl acrylate), poly(2-ethoxyethyl acrylate), poly(ethyl acrylate), poly(2-ethylhexyl acrylate), poly(fluoromethyl acrylate), poly(5,5,6,6,7,7,7-heptafluoro-3-oxaheptyl acrylate), poly(heptafluoro-2-propyl acrylate), poly(heptyl acrylate), poly(hexyl acrylate), poly(isobornyl acrylate), poly(isopropyl acrylate), poly(3-methoxybutyl acrylate), poly(methyl acrylate), poly(nonyl acrylate), poly(octyl acrylate), poly(propyl acrylate), and poly(p-tolyl acrylate);

polyvinylacrylates, fluorocarbons and fluoropolymers;

poly(acrylamides) such as poly(acrylamide), poly(N-butylacrylamide), poly(N,N-dibutylacrylamide), poly(N-dodecylacrylamide), and poly(morpholylacrylamide);

poly(methacrylic acids) and poly(methacrylic acid esters) such as poly(benzyl methacrylate), poly(octyl methacrylate), poly(butyl methacrylate), poly(2-chloroethyl methacrylate), poly(2-cyanoethyl methacrylate), poly(dodecyl methacrylate), poly(2-ethylhexyl methacrylate), poly(ethyl methacrylate), poly(1,1,1-trifluoro-2-propyl methacrylate), poly(hexyl methacrylate), poly(2-hydroxyethyl methacrylate), poly(2-hydropropyl methacrylate), poly(isopropyl methacrylate), poly(methacrylic acid), poly(methyl methacrylate) in various forms such as, atactic, isotactic, syndiotactic, and heterotactic; and poly(propyl methacrylate);

poly(methacrylamides) such as poly(4-carboxy phenyl-methacrylamide);

other alpha- and beta-substituted poly(acrylics) and poly(methacrylics) such as poly(butyl chloracrylate), poly(ethyl ethoxycarbonylmethacrylate), poly(methyl fluoroacrylate), and poly(methyl phenylacrylate);

poly(vinyl ethers) such as poly(butoxyethylene), poly(ethoxyethylene poly(ethylthioethylene (dodecafluorobutoxyethylene), poly poly(2,2,2-trifluoroethoxytrifluoroethylene), poly(hexyloxyethylene), poly(methoxyethylene), and poly(2-methoxypropylene);

poly(vinyl halides) and poly(vinyl nitriles) such as poly(acrylonitrile), poly(1,1-dichloroethylene), poly(chlorotrifluoroethylene), poly(1,1-dichloro-2-fluoroethylene), poly(1,1-difluoroethylene), poly(methacrylonitrile), poly(vinyl chloride), and poly(vinylidene chloride);

poly(vinyl esters) such as poly(vinyl acetate), poly(benzoyloxyethylene), poly(4-butyryloxybenzoyloxyethylene), poly(4-ethylbenzoyloxyethylene), poly[(trifluoroacetoxy)ethylene], poly[(heptafluorobutyryloxy)ethylene], poly(formyloxyethylene), poly[(2-methoxybenzoyloxy)ethylene], poly(pivaloyloxyethylene), and poly(propionyloxyethylene);

poly(styrenes) such as, poly(4-acetylstyrene), poly[3-(4-biphenylyl)styrene], poly(4-[(2-butoxyethoxy)methyl]styrene), poly(4-butoxymethyl styrene), poly(4-butoxystyrene), poly(4-butylstyrene), poly(4-chloro-2-methylstyrene), poly(2-chlorostyrene), poly(2,4-dichlorostyrene), poly(2-ethoxymethyl styrene), poly(4-ethoxystyrene), poly(3-ethylstyrene), poly(4-fluorostyrene), poly(perfluorostyrene), poly(4-hexylstyrene), poly[4-(2-hydroxyethoxymethyl)styrene], poly[4-(1-hydroxy-1-methylpropyl)styrene], poly(2-methoxymethylstyrene), poly(2-methoxystyrene), poly(alpha-methylstyrene), poly(2-methylstyrene), poly(4-methoxystyrene), poly(4-octanoylstyrene), poly(4-phenoxystyrene), poly(4-phenylstyrene), poly(4-propoxystyrene), and poly(styrene);

poly(oxides) such as poly(ethylene oxides), poly(tetrahydrofuran), poly(oxetanes), poly(oxybutadiene), poly[oxychloromethyl)ethylene], poly(oxy-2-hydroxytrimethyleneoxy-1,4-phenylenemethylene-1,4-phenylene), poly(oxy-2,6-dimethoxy-1,4-phenylene), and poly(oxy-1,3-phenyl ene);

poly(carbonates) such as polycarbonate of Bisphenol A, and poly[oxycarbonyloxy-4,6-dimethyl]-1,2-phenylenemethylene-3,5-dimethyl-1,2-phenylene];

poly(esters) such as poly(ethylene terephthalate), poly[(1,2-diethoxycarbonyl)ethylene], poly[(1,2-dimethoxycarbonyl)ethylene], poly(oxy-2-butenyleneoxysebacoyl), poly[di(oxyethylene)oxyadipoyl], poly(oxyethyleneoxycarbonyl-1,4-cyclohexylenecarbonyl), poly(oxyethyleneoxyisophthaloyl), poly[di(oxyethylene)oxyoxalyl], poly[di(oxyethylene)oxysuccinyl], poly(oxyethyleneoxyterephthaloyl), poly(oxy-1,4-phenyleneisopropylidene-1,4-phenylene oxysebacoyl), and poly(oxy-1,3-phenyleneoxyisophthaloyl);

poly(anhydrides) such as poly(oxycarbonyl-1,4-phenylenemethylene-1,4-phenyl enecarbonyl), and poly(oxyisophthaloyl);

poly(urethanes) such as poly(oxycarbonyliminohexamethyleneiminocarbonyloxydecamethylene), poly(oxyethyleneoxycarbonyliminiohexamethyleneiminocarbonyl), poly(oxyethyleneoxycarbonylimino-1,4-phenylenetrimethylene-1,4-phenyleneiminocarbonyl), poly(oxydodecamethyleneoxycarbonyliminodecamethyleneiminocarbonyl), and poly(oxytetramethyleneoxycarbonylimino-1,4-phenylenemethylene-1,4-phenyleneiminocarbonyl);

poly(siloxanes) such as, poly(dimethylsiloxane), poly[oxy(methyl)phenylsilylene], and poly(oxydiphenylsilylene-1,3-phenylene);

poly(sulfones) and poly(sulfonamides) such as poly[oxycarbonyl di(oxy-1,4-phenylene)sulfonyl-1,4-phenyleneoxy-1,4-phenylene], poly[oxy-1,4-phenylenesulfinyl-1,4-phenyleneoxy-1,4-phenylenecarbonyl-1,4-phenylene), poly(oxy-1,4-phenylenesulfonyl-1,4-phenylene), and poly(sulfonyl-1,3-cyclohexylene);

poly(amides) such as nylon-6, nylon-6,6, nylon-3, nylon-4,6, nylon-5,6, nylon-6,3, nylon-6,2, nylon-6,12, and nylon-12;

poly(imines) such as poly(acetyliminoethylene), and poly(valeryl iminoethylene poly(benzimidazoles) such as poly(2,6-benzimidazolediyl-6,2-benzimidazolediyloctamethylene);

carbohydrates such as amylose triacetate, cellulose triacetate, cellulose tridecanoate, ethyl cellulose, and methylcellulose;

and polymer mixtures and copolymers thereof such as poly(acrylonitrile-co-styrene) with poly(e-caprolactone), or poly(ethyl methacrylate), or poly(methyl methacrylate);

Poly(acrylonitrile-co-vinylidene chloride) with poly(hexamethylene terephthalate);

Poly(allyl alcohol-co-styrene) with poly(butylene adipate), or poly(butylene sebacate); poly(n-amyl methacrylate) with poly(vinyl chloride);

bisphenol A polycarbonate with poly(e-caprolactone), or poly(ethylene adipate), or poly(ethylene terephthalate), or novolac resin;

poly(butadiene) with poly(isoprene);

poly(butadiene-co-styrene) with glycerol ester of hydrogenated rosin;

poly(butyl acrylate) with poly(chlorinated ethylene), or poly(vinyl chloride);

poly(butyl acrylate-co-methyl methacrylate) with poly(vinyl chloride);

poly(butyl methacrylate) with poly(vinyl chloride);

poly(butylene terephthalate) with poly(ethylene terephthalate), or poly(vinyl acetate-co-vinylidene chloride);

poly(e-caprolactone) with poly(chlorostyrene), or poly(vinyl acetate-co-vinylidene chloride);

cellulose acetate with poly(vinylidene chloride-co-styrene);

cellulose acetate-butyrate with poly(ethylene-co-vinyl acetate);

poly(chlorinated ethylene) with poly(methyl methacrylate);

poly(chlorinated vinyl chloride) with poly(n-butyl methacrylate), or poly(ethyl methacrylate), or poly(valerolactone);

poly(chloroprene) with poly(ethylene-co-methyl acrylate);

poly(2,6-dimethyl-1,4-phenylene oxide) with poly(a-methylstyrene-co-styrene styrene), or poly(styrene);

poly(ethyl acrylate) with poly(vinyl chloride-co-vinylidene chloride), or poly(vinyl chloride);

poly(ethyl methacrylate) with poly(vinyl chloride);

poly(ethylene oxide) with poly(methyl methacrylate);

poly(styrene) with poly(vinyl methyl ether); and poly(valerolactone) with poly(vinyl acetate-co-vinylidene chloride).

The water dispersible film-forming are typically selected from the group comprising:

Styrene butadiene copolymers, typically in a dispersion;
Modified styrene butadiene copolymers, typically in a dispersion;
Styrene/acrylate copolymers, typically in a dispersion:
Carboxylated polystyrene, typically in a dispersion:
Acrylic/polyacrylic polymers, typically in a emulsion
Polyvinyl Acetate;
Polypolyvinyl alcohol,
Polyvinylacetate-ethylene,
Polyvinyl acrylic;
Soy protein polymer;
Corn Zein (protein) or starch, typically in a dispersion;
Polyolefin dispersion as modified propylene-based dispersion;
Rosin ester dispersions, and
Polyvinylidene chloride.

The present invention relates to a novel composition that allows for the formation of a continuous and cohesive film which provides water resistance, grease and oil resistance, and water vapour barrier properties at a very fast set speed without the need of a thermal energy and which can be used as wax replacement treatment and a top coat for flexible packaging. The absence of the need to apply thermal energy has dramatic advantages from an industrial, commercial, plant manufacturing and economic stand point. The ability to provide a continuous and cohesive film which provide a water resistance, grease and oil resistance, and water vapour barrier properties without the presence of wax has dramatic environmental implications, as well as economic considerations given the volatile costs of petroleum based products.

The term absence of thermal energy, or the need for added thermal energy is intended to mean that a heater, oven or other direct heating device is not required in the film-forming process of the invention. The process occurs without direct heating. Otherwise stated, the film-forming process occurs at a temperature from about 0 to 50° C., typically from about 10 to 45° C., such as 15 to 40° C., typically at ambient temperature between 15 to 35° C.

The catalytic composition allows for the water-based polymeric composition to form a film at a first rate without added heat. The catalytic composition allows for the water-based polymeric composition to form a film without added heat with the film-formation in less than one minute from application of the composition to the surface. The catalytic composition allows for the water-based polymeric composition to form a film without added heat and without the use of wax. The terms wax free composition, free of wax, without wax is intended to mean a polymeric composition, and resultant film with less than 0.1% wax, typically with 0% wax.

The film-forming polymeric composition of the invention may optionally comprise a tackifier resin, such as an aqueous dispersion of glycerol ester of hydrogenated rosin.

The film-forming polymeric composition of the invention may optionally comprise a filler selected from the group consisting of delaminated clays, kaolin, mica, talc or a mixture, silicate, calcium silicate, calcium carbonate, aluminium hydrate, and mixtures thereof.

The film-forming polymeric composition of the invention may optionally comprise a dispersing agent, a thickener agent, a defoaming agent, a slip agent, an antiskid agent, rheology modifiers, pigments, susceptor materials, crosslinking agents, catalysts, flame retardants, biocides, and wetting agent.

Pigment may be added to the film-forming composition to give the surface of the coated substrate or sheet material a desired appearance. For example, it may be desired that a food-contacting surface of the coated sheet material be a white color. In the event brown kraft paper is used as the substrate sheet material, titanium dioxide may be added to the barrier coating composition to make it white and to make the food-contacting surface of the sheet material white when the barrier coating composition is applied. Pigments such as TI-PURE® 900, a titanium dioxide pigment made by DuPont, are suitable pigments for the barrier coating. Other pigments or dispersions may be suitable so long as they do not significantly degrade the performance of the barrier coating composition.

A dispersing agent may be added to the film-forming composition to help disperse and suspend any component, including fillers and pigment particles, in the composition before application, and to stabilize the suspension. Any of a variety of dispersing agents may be used. For example, dispersing agents such as tetra sodium pyrophosphate ("TSPP") and sodium hexa meta phosphate are suitable for this purpose. It may be desirable to add a minor amount of fine metal powder or flakes, such as aluminum powder or flakes, to the barrier coating composition or release coating composition as a susceptor material.

The fast drying film formation barrier coatings composition suitably comprises, in weight % to a total of 100%, the following:

| | |
|---|---|
| Stearate calcium, aluminium or zinc dispersion: | 5 to 30%, preferably 17 to 27% |
| $C_{11}$-$C_{18}$ fatty acid complex of a metal ion (Quilon L, C or S) | 0.5 to 3%, preferably 1 to 3% |
| Dispersion of polymer or a mixture | 25 to 80%, preferably 80 to 50% |
| Filler as powder or dispersion of slurry | 0 to 30% |
| Additives | 0 to 5%, preferably 0 to 3% |

The film-forming composition of the invention is applied, without the need for added thermal energy, in the form of a solution, dispersion, emulsion, suspension, or in a solvent-free form to the surface of a material for film-formation. The material may be cellulose-based, metallic, textile, cement, sand, stone or glass. Cellulose-based materials include paper, card, wood of all sorts, including paperboard, kraft paper. Some of the numerous uses include use in frozen-foods, food packaging, paper for baking, corrugated paperboard, cardboard boxes, wrapping materials for consumable and non-consumable goods, such as hamburgers and sandwiches, such as in fast-food outlets. Metallic surfaces, such as pans, pots and baking trays, each comprising a film prepared from a film-forming composition of the invention, are also anticipated. Furniture and wood-based building materials, each comprising a film prepared from a film-forming composition of the invention, are also anticipated. Cement, outdoor tiling, pavement and the like, each comprising a film prepared from a film-forming composition of the invention, are also anticipated.

While the use of component ii) hereinbefore, namely, the $C_9$-$C_{18}$ fatty acid complex of a metal ion is preferred, it is found that acceptable film forming compositions are provided by components i) and iii) described hereinbefore, in accordance with the invention, especially when component i) is in a relatively high concentration. Typically these compositions will improve 20 to 40% by weight of component i) and 80 to 60% of component iii) to a total of 100%.

EXAMPLES

In order to illustrate the foregoing novel compositions, the following examples are provided to further teach preferred embodiments of the invention. The novel water based barrier coating compositions are express in weight % to a total of 100%.

Example 1

| | |
|---|---|
| Devflo 50C | 18.0% |
| Quilon C | 2.0% |
| Styronal 4606X | 80.0% (trade mark for an aqueous styrene-butadiene dispersion) |

Example 2

| | |
|---|---|
| Devflo 50C | 17.5% |
| Quilon C | 2.5% |
| Styronal 4606X | 40.0% |
| Acronal S728 | 40.0% (trade mark for an aqueous dispersion of styrene n-butyl acrylate) |

Example 3

| | |
|---|---|
| Devflo 50C | 17.5% |
| Quilon C | 2.5% |
| Styronal 4606X | 50.0% |
| Alsibronz 39 | 10.0% |
| Polyplate P | 10.0% |
| Polygloss 90 | 19.6% |
| Tamol 850 | 0.2% (trade mark for a naphthalene sulfonic acid condensation product) |
| Defoamer colloid 963 | 0.2% |

Example 4

| | |
|---|---|
| Devflo50LPH | 18.0% |
| Quilon C | 2.0% |
| Styronal 4606X | 80.0% |

Example 5

| | |
|---|---|
| Devflo 50LPH | 17.5% |
| Quilon C | 2.5% |
| Styronal 4606X | 40.0% |
| Acronal S728 | 40.0% |

Example 6

| | |
|---|---|
| Devflo50LPH | 17.5% |
| Quilon C | 2.5% |
| Styronal 4606X | 50.0% |
| Alsibronz 39 | 10.0% |
| Polyplate P | 10.0% |
| Polygloss 90 | 19.6% |
| Tamol 850 | 0.2% |
| Defoamer colloid 963 | 0.2% |

Example 7.

| | |
|---|---|
| Devflo 40 RZ1 | 18.0% |
| Quilon C | 2.0% |
| Styronal 4606X | 80.0% |

All percentages herein are by weight unless otherwise indicated.

The invention claimed is:

1. A process for providing water, vapour, oil and grease resistance to a paper or paperboard material comprising:
   I. combining a) a salt of one or more of myristic, palmitic and stearic acid; and b) a polymeric composition comprising a polymer, a copolymer, or mixtures of polymers or copolymers, in the presence of an aqueous solvent, to form a water-based film-forming composition, said film-forming composition comprises 20 to 40% by weight of a) and 80 to 60% by weight of b), based on the total weight of a) and b);
   II. coating a surface of the material with said water-based film-forming composition; and
   III. allowing a film of said polymeric composition to form on the material at a temperature less than 50° C.

2. The process of claim 1, wherein step I) further comprises combining a) and b) with c) a $C_9$-$C_{18}$ fatty acid complex of a metal ion, said metal ion having an oxidation state of at least 3.

3. The process of claim 2 wherein said salt in a) is calcium stearate and said metal ion in c) is chromium ion.

4. The process of claim 2 wherein a) and c) are in a ratio of 5:1 to 20:1.

5. The process of claim 1, wherein said film in step III is formed without added thermal or microwave energy.

6. The process of claim 1, wherein said film in step III is formed without direct heat.

7. The process of claim 1, wherein said water-based film-forming composition comprise 5 to 30% by weight of said salt a), 0 to 30% by weight of filler, based on the total weight of the water-based film-forming composition.

8. The process of claim 6, wherein said film in step III is formed in less than 1 minute.

9. The process of claim 8, wherein said salt of one or more of myristic, palmitic and stearic acid is selected from the group consisting of sodium, potassium, calcium, and zinc salts.

10. The process of claim 9, wherein said salt is calcium stearate or zinc stearate.

11. The process of claim 9, wherein said film is formed at a temperature of 15 to 35° C.

12. A process for providing water, vapour, oil and grease resistance to a material comprising:
   I. combining a) a salt of one or more of myristic, palmitic and stearic acid; b) a polymeric composition comprising a polymer, a copolymer, or mixtures of polymers or copolymers; and c) a tackifier resin, in the presence of an aqueous solvent, to form a water-based film-forming composition;
   II. coating a surface of the material with said water-based film-forming composition; and
   III. allowing a film of said polymeric composition to form on the material at a temperature less than 50° C.

13. The process of claim 12, wherein said tackifier resin is a glycerol ester of hydrogenated rosin.

14. The process of claim 1, wherein said material is a cellulose based material.

15. A process for providing water, vapour, oil and grease resistance to a material comprising:
   I. combining a) a salt of one or more of myristic, palmitic and stearic acid selected from the group consisting of sodium, potassium, calcium, and zinc salts; b) a polymeric composition comprising a polymer, a copolymer, or mixtures of polymers or copolymers; and c) a tackifier resin, in the presence of an aqueous solvent, to form a water-based film-forming composition; said film-forming composition comprising 20 to 40% by weight of a) and 80 to 60% by weight of b), based on the total weight of a) and b);
   II. coating a surface of the material with said water-based film-forming composition; and
   III. allowing a film of said polymeric composition to form, in less than 1 minute without direct heat, on the material at a temperature less than 50° C.

16. The process of claim 15, wherein said tackifier resin is a glycerol ester of hydrogenated rosin.

17. The process of claim 8, wherein said material is a cellulose based material.

* * * * *